Patented July 3, 1951

2,559,466

UNITED STATES PATENT OFFICE 2,559,466

ACID-MODIFIED COPOLYMERS OF DRYING OIL ACIDS, MALEIC-POLYHYDRIC ALCOHOL ESTERS, AND PROCESS OF MAKING SAME

Frank B. Root, Montclair, N. J., assignor to Ellis-Foster Company, a corporation of New Jersey No Drawing. Application September 17, 1948, Serial No. 49,864

22 Claims. (Cl. 260—22)

1

This invention relates to compositions suitable for surface coatings, which comprise an esterified copolymer of a polymerizable monomeric compound containing a single $>C=CH_2$ group per molecule and the reaction product of ingredients which comprise drying oil acids, polyhydric alcohols, maleic anhydride and another esterifiable acid. In particular it relates to an esterified composition wherein a monohydroxyl-containing drying oil acid-polyhydric alcohol ester is esterified both with a polymer resulting from the conjoint polymerization of a liquid polymerizable monomer with the maleic acid half-ester of said monohydroxy ester and with another esterifiable acid.

It is an object of this invention to provide a process whereby soluble copolymers can be obtained from a wide range of proportions of polymerizable $>C=CH_2$ compounds. It is also an object to produce soluble copolymerized drying oil esters having improved drying characteristics and capable of forming coating compositions having great hardness, high durability, and good water-resistance. Other objects will be apparent from the detailed description which follows.

In my copending application Serial No. 775,952, filed September 24, 1947, of which the present case is a continuation in part, there is disclosed a procedure which comprises essentially the steps of (1) forming a monohydroxy ester of general formula $D_{n-1}POH$, wherein D is the radical of a drying oil acid free from conjugated carbon-carbon unsaturation, P is the hydroxyl-free residue of a polyhydric alcohol $P(OH)_n$, and $n$ is the number of hydroxyl groups in said polyhydric alcohol, (2) reacting 2 moles of this hydroxy compound with 1 mole of an unsaturated alpha-beta-dicarboxylic acid under such conditions that only a half-ester is formed, whereby the reaction mixture consists of an equimolecular mixture of the monohydroxy compound $D_{n-1}POH$ and its unsaturated dicarboxylic acid half-ester, (3) adding the copolymerizable compound containing a single ethylenic linkage and heating the mixture under polymerizing but non-esterifying conditions to get the copolymer of the dicarboxylic acid half-ester, and finally (4) heating the mixture under esterifying conditions to esterify the carboxylic groups of the copolymer with the monohydroxy ester.

(1) In forming the monohydroxyl-containing compound, the reaction involves $n-1$ moles of drying oil acids and 1 mole of polyhydric alcohol. As in all reactions in which a polyfunctional compound enters, a mixture of esters is possible and it is of utmost importance that the reaction product consists essentially of monohydroxy esters. Esters containing more than one hydroxyl group must be at a minimum or non-influential amount, otherwise gelation will occur in the final esterification step before the acid number is adequately lowered. Also, polyhydroxy compounds may form half-esters with the unsaturated dicarboxylic anhydride in the second step, which contain more than one unsaturated dicarboxylic acid group, and lead to premature gelation in the polymerization step. The reaction product from this step must be free from an influential amount of esters containing more than one hydroxyl group.

In general, the reaction of $n-1$ moles of drying oil acids with 1 mole of polyhydric alcohol at a temperature between 190 and 250° C. produces a satisfactory hydroxyl-containing ester product although, for certain purposes, particularly with a polyhydric alcohol which contains a relatively large number of hydroxyl groups such as pentaerythritol or polypentaerythritol, a slight excess (about 0.1 mole) of monocarboxylic acid may be used to advantage. This reduces the probability of free polyhydric alcohol and esters containing more than one hydroxyl group. Also, the reaction temperature must not be high enough to produce any substantial polymerization of the drying oil ester, since the intermolecular polymerization product contains more than one hydroxyl group and tends to cause gelation in the final step. A temperature below about 250° C. is suitable for making the hydroxyl ester.

In place of drying oil acids, the drying oils themselves may be alcoholized with glycerol or other polyhydric alcohol to form a monohydroxy ester. The drying oils and the acids therefrom are unpolymerized and include those containing substantially no conjugated unsaturation such as linseed, soya bean, sunflower seed, walnut, perilla, etc. Suitable esterifiable polyhydric alcohols are glycerol, polyglycerol, glycols and polyglycols (ethylene glycol, diethylene glycol, etc.), pentaerythritol, polypentaerythritol, trimethylol propane, etc.

(2) The monohydroxy drying oil fatty acids-polyhydric alcohol ester is heated with an unsaturated dicarboxylic acid anhydride such as maleic, chloromaleic, itaconic or citraconic anhydride. The corresponding acids may be used, if desired, since they break down readily into the anhydride. The reaction proceeds rapidly even at temperatures below 200° C. Thus, the time and temperature in this step are inadequate to cause esterification or any reaction other than addition of the anhydride to the hydroxy ester with formation of the dicarboxylic acid half-ester. When 1 mole of unsaturated dicarboxylic anhydride and 2 moles of the monohydroxy ester are used the result is an esterfiable mixture of equal moles of the monohydroxy ester and its dicarboxylic acid half-ester. No molecules containing more than one unsaturated dicarboxylic acid radical are possible except what might result in minute amount from traces of esters containing more than one hydroxyl group unavoidably derived from the first step. While the ratio of acid anhydride to monohydroxy ester is preferably 1 mole to 2 moles, since an excess of hydroxyl groups insures reaction of all the acid anhydride, more or less of the anhydride may be used, as is explained later. Also, where a slight excess of drying oil acids is used in the first step, the proportion of acid anhydride may be correspondingly diminished if a final low acid number is essential.

The temperature for the second step is between about 140° and 200° C. and preferably between 170° and 180° C., and half-ester formation occurs in a short time (e. g., less than 30 minutes at 170° C.).

A modification of the second step consists in reacting maleic anhydride with a mixture of the monohydroxyl - containing polyhydric alcohol ester and monohydric alcohol such as hydroabietyl alcohol or stearyl alcohol.

(3) The next step is copolymerization of the unsaturated dicarboxylic acid half-ester of the mixture with a liquid monomeric unsaturated polymerizable compound in which the unsaturation is due to a single terminal ethylenic linkage $>C=CH_2$. The latter compound may be a monohydric alcohol ester of acrylic or methacrylic acid, acrylonitrile, a vinyl ester of a saturated monocarboxylic acid (e. g., vinyl acetate), styrene, and nuclear-substituted styrenes such as chlorostyrene and methyl styrene, a monovinyl ether, or a monobasic acid ester of allyl or methallyl alcohol. The most available compound is styrene. The proportion of such compound may be varied over a wide range. For example, the polymerization mixture may comprise 5% of polymerizable $>C=CH_2$ compound and 95% of the esterifiable ester mixture, and extend to about 90% $>C=CH_2$ compound and 10% of the esterifiable ester mixture. Thus, coating compositions of varied oil-length are possible.

The temperature required for copolymerization is below 200° C. and is preferably between about 120° and 170° C., depending upon the boiling point of the $>C=CH_2$ compound. The reaction may be carried out under pressure, if desired, and also in the presence of about 1% or less of a polymerization catalyst such as benzoyl peroxide, acetyl peroxide, lauryl peroxide, di-tertiary butyl peroxide, tertiary butyl hydroperoxide, etc.

After polymerization has proceeded until the viscosity no longer increases or increases very slowly, the solution is heated to drive off any unpolymerized compounds, which may be thus recovered.

(4) Esterification to form the final product is carried out at 200° C. or higher, for example at between 200° C. and 300° C. Since the reaction at this stage is theoretically between a monohydroxy compound and a polycarboxylic compound, the polyester is of the linear type and does not reach an infusible gel-stage through esterification. However, if an influential amount of esters containing more than one hydroxyl group is present, the mixture would naturally form a gel before the acid number is adequately lowered. A gel is formed on long heating through the normal bodying reaction of drying oil acid polyesters and the esterification is carried out as long as is necessary to obtain a soluble final ester of low acid number. The acid number is preferably below 20.

The esterification mixture is heated as stated above, and the heating may be at atmospheric or reduced pressure. If vacuum treatment is used it is advisable to add an anti-foam agent (e. g., a silicone oil), since products of high viscosity tend to foam. Esterification may also be accomplished by azeotropic distillation of the water in the presence of a high boiling liquid such as xylene. In some cases the unreacted monomer (e. g., styrene) of step 3 may be used as the water-entraining liquid.

If desired, the final esterification step may be carried out in the presence of other substances such as oil-soluble resins, drying oils, mixtures of drying oils and resins, or waxes. Since copolymerization results in the substantial disappearance of the unsaturation of the dicarboxylic acid radicals, these other substances may include material containing conjugated double bonds such as tung oil or rosin. Also, if desired, the esterification step may be carried out by baking the product from step 3 in the form of an applied finish, with or without other additions as noted above, including pigments and driers.

In the second step the unsaturated dicarboxylic acid anhydride reacts only to form a half-ester. No diene reaction with the drying oil acid radicals is possible since the time is too short and the temperature is below 200° C. Also, during the copolymerization step the temperature is too low for a diene reaction, and the copolymerization reaction between unsaturated dicarboxylic acid groups and $>C=CH_2$ groups is sufficiently faster than any possible reaction between drying oil acids groups and $>C=CH_2$ groups. Thus, the process avoids side-reactions which increase the reaction-functionality of the reactants, and results in a soluble final product. As noted above, the final ester is not permanently soluble and fusible since polymerization of the drying oil radicals ultimately causes gelation. However, esterification occurs before this change takes place, particularly when the esterification occurs under vacuum or in the presence of an inert gas such as carbon dioxide or nitrogen.

The present invention consists in replacing part of the unsaturated dicarboxylic acid, which is preferably maleic anhydride, by another esterifiable acid. Although boric acid is suitable, the modifying acid is in general a carboxylic acid, either monocarboxylic or polycarboxylic, and substituted or unsubstituted. Thus, 2 moles of the monohydroxy ester $D_{n-1}POH$ are heated with from 0.3 to 0.9 mole (instead of 1 mole) of maleic anhydride to the half-ester stage and another secondary or modifying acid is subsequently added in amount equivalent to the difference between 1 mole of maleic anhydride and the amount (0.3 to 0.9 mole) used to form the maleic half-ester mixture.

The stage in the process at which the other acid is added is dependent upon the nature of the acid. For example, if phthalic is the modifying acid, it may be added (a) along with the maleic, (b) immediately following the reaction of the maleic, or (c) following the polymerization step and either before or after removal of unreacted polymerizable monomer. If rosin is the modifying acid, it should not be added until after unsaturated maleic groups have been eliminated by copolymerization. If the acid secondarily added is maleic or fumaric, the stage should be after removal of unreacted polymerizable monomer. In general the secondary addition of acid is made prior to or during the final esterification step. The operating conditions when secondarily added acids are used are essentially the same as in the prior process.

The particular esterifying acid chosen for secondary addition or modification of the product depends upon the properties it confers. For example, phthalic anhydride gives a final product whose films are faster drying and have better adhesion than when phthalic is absent. A small amount of rosin reacted in accordance with the invention improves clarity in certain cases. Tung oil acids improve drying somewhat. Maleic anhydride or fumaric acid (as the secondary acid) give products of increased viscosity. An advantage of the process is that products of varying properties can be obtained. Also, in many cases the substitution of part of the maleic acid by another results in lower cost. However, the principal advantage of the present process lies in the fact that there is less possibility in Step 2 (half-ester formation) of producing compounds having more than one maleic group which favors gelation during copolymerization, since there is large excess of hydroxyl groups in that step in the present process. An excess of hydroxy compound during the formation of the half-ester and during polymerization restricts undesirable side-reactions, and subsequent esterification of this excess produces a clear homogeneous soluble composition. The formation of a clear final product is unexpected since the mere addition of such substances as drying oils and drying oil alkyd resins to a preformed unmodified alkyd-styrene copolymer, such as obtained by the prior process, results in turbidity. The modified products of the present invention have improved compatibility with drying oils and resins.

Among the acids which are applicable in the present process as modifying agents of the maleic copolymer compositions are phthalic, succinic, adipic, sebacic, azelaic, benzoic, citric, maleic, fumaric, citraconic, itaconic, aconitic, tetrahydrophthalic, endo-methylene-tetrahydrophthalic, saturated fatty acids (e. g., acetic, palmitic, stearic, etc.), unsaturated fatty acids (e. g., oleic, linoleic, linolenic, eleostearic or the mixed acids of drying oils), rosin, hydrogenated rosin and sorbic acid and the inorganic acid boric acid. Another type of modifying acid material comprises drying oil adducts such as from linseed or tung oil with maleic anhydride or rosin-maleic anhydride adducts. A plurality of modifying acids can be used.

The products include reaction products ranging from oils to relatively hard resins depending upon the amount of copolymerized liquid monomer. They are soluble in esters, ketones and hydrocarbons, those containing more of the copolymerized liquid monomer being soluble in aromatic hydrocarbons or mixtures of aromatic hydrocarbons and mineral spirits and those containing less of the copolymerized monomer being soluble in aliphatic hydrocarbons such as straight mineral spirits. The products are adapted for coating compositions and other uses such as printing inks, linoleum, oil cloth, or as cold-molding binders.

The inclusion of an antiskinning agent or stabilizer in the varnish or enamel is usually advisable. If the stabilizer is heat-stable it can be advantageously added during the final esterification; otherwise it is added to the coating solution. The amount is generally from 0.05% to 0.5% of the resin, which amount is insufficient to retard drying. Hydroquinone, di-tertiary butyl hydroquinone, resorcinol and phenyl naphthyl amine are examples of known stabilizers. Another type which is very effective comprises ketoximes such as dimethyl ketoxime or methyl ethyl ketoxime. Another means of increasing the storage stability of the solutions is to add varying amounts of a resin such as polycoumarone, polyindene or the resin obtained by polymerizing beta-pinene.

The following examples are given to illustrate the invention.

*Example 1.*—Rosin-modified styrene copolymer of soya-maleic-glyceride.

In a flask equipped with stirrer, carbon dioxide inlet and thermometer, 3000 grams (3.4 moles) of refined soya bean oil, 164 grams (1.7 moles) of glycerol and 1 gram of litharge were heated to 230° C. in 1.25 hours and held at 230°–245° C. for 2 hours. To 308 grams (0.5 mole) of the diglyceride thus formed there was added 18.4 grams (0.19 mole) of maleic anhydride and the mixture was heated with agitation for 15 minutes at 170° C. The product was mixed with 246 grams of styrene, and 4.3 grams of tertiary butyl peroxide, and heated under reflux so that the temperature rose gradually from 75° C. to 167° C. over a period of 2.5 hours. Then 42 grams (0.12 mole) of rosin was added and the mixture heated for 1 hour at 290–300° C. under $CO_2$ at atmospheric pressure and 1 hour at 290–300° C. under a pressure of 25 mm. mercury. The product at room temperature was a clear, tough, amber resin having an acid number of 11 and a converted styrene content of 39%. The resin was soluble in mineral spirits.

A varnish was prepared from the resin by dissolving 5 parts of it in a mixture of 4 parts of mineral spirits and 1 part of xylene by weight and adding naphthenate drier to give 0.16% Pb and 0.02% Co based on solids. A film of this varnish dried to a tack-free condition in 6 5 hours at room temperature. The dried film was tough and was unusually resistant to aqueous alkali.

*Example 2.*—Tung oil acids-modified chlorostyrene copolymer of soya-maleic-pentaerythritol ester.

A 500-ml. flask equipped with agitator and thermometer was charged with 6 grams (0.06 mole) of maleic anhydride and 213 grams (0.24 mole) of the monohydroxy ester obtained by heating 1 mole of pentaerythritol with 3 moles of soya bean oil acids for 1 hour at 200°–220° and then for 4 hours at 220°–230° C. The mixture of the anhydride and ester was heated for 10 minutes at 155–170° C. and, after cooling to 150° C., the resulting product was dissolved in 55 grams of mixed o- and p-chlorostyrene containing 0.9 gram of di-tertiary butyl peroxide. A reflux-tube was attached, and polymerization was effected by heating for 1.5 hours at 130–185° C. The polymerizate was mixed with 33 grams (0.12 mole) of tung oil acids, 0.6 gram of p-toluenesulfonic acid monohydrate and 55 grams of xylene. A water-trap was inserted in the system, and the ingredients were heated for 1.75 hours at 200° C. An additional 0.3 gram portion of sulfonic acid was added and heating was continued for 7 hours at 200–245° C. The product, after filtration to remove a trace of suspended matter, was freed of solvent under reduced pressure. It was a clear, reddish-brown oil having a viscosity of approximately Z–3, and an acid number of 8.

A varnish was made by dissolving the oil in mixed solvent containing 2 parts of mineral spirits and 1 part of xylene by weight (50% non-volatiles), and adding cobalt naphthenate to give 0.03% Co based on oil. A film of this varnish aged for 3 days was unusually resistant to water and aqueous alkali.

*Example 3.*—Phthalic-modified styrene copolymer of soya-maleic-glyceride.

In a reactor equipped with thermometer and agitator, 308 grams (0.5 mole) of soya oil acids-diglyceride (prepared as in Example 1) was heated with 18.4 grams (0.19 mole) of maleic anhydride for 15 minutes at 170° C. To the product, cooled to 125° C., there was added a solution containing 270 grams of styrene and 1.8 grams of di-tertiary butyl peroxide. A reflux tube was attached to the reactor and the solution was brought to a temperature of 150° C. and held at 150–163° C. for 1 hour. No appreciable refluxing occurred during polymerization. Phthalic anhydride in the amount of 9.3 grams (0.06 mole) was added to the polymerizate and heating was continued for 1 hour at 155–165° C. The reflux tube was then replaced by a down-turned condenser and receiver and the batch was heated to 240° C. and held for 1.25 hours, while a slow stream of carbon dioxide was passed through. During the course of this treatment a total of 29 grams of distillate was evolved, including a non-aqueous layer of 25 grams. The product was a slightly hazy, tough, amber-colored resin having an acid number of 19 and a converted styrene content of 43%.

A varnish was made from the product by reducing it to 50% solids with mixed solvent containing 4 parts of mineral spirits and 1 part of xylene, and adding mixed naphthenate drier sufficient to give 0.06% Pb and 0.02% Co based on solids. The varnish was clear after removal of slight haze by filtration with 1% of a siliceous filter-aid. A film of this varnish dried dust-free in 0.5 hour and tack-free in 4 hours. The overnight-dried film had a Sward hardness of 26. A film aged 3 days and immersed for 3 days in tap water at 25° C. developed a barely perceptible haze which disappeared after exposure of the film in air for 0.5 hour.

*Example 4.*—Phthalic-modified styrene copolymer of soya-maleic-ethylene glycol ester.

A reactor, equipped with thermometer, agitator, and steam-jacketed reflux condenser, was charged with 800 grams (3 moles) of soya bean oil acids and 186 grams (3 moles) of ethylene glycol. The mixture was heated for 5 hours at 180–223° C., giving a mono-hydroxy ester of acid number 5. A mixture of 124 grams (0.4 mole) of this ester and 9.8 grams (0.1 mole) of maleic anhydride was heated for 10 minutes at 160–170° C. The acid-ester thus formed was mixed with 134 grams of styrene, 0.8 gram of di-tertiary butyl peroxide and 14.8 grams (0.1 mole) of phthalic anhydride, and heated under reflux for 3 hours at 150–180° C. Thereafter the reflux condenser was arranged for distillation and the temperature raised to 255° C. in 45 minutes and held at 255–268° C. for 1.25 hours, thus removing unreacted monomer and effecting esterification. The product was a clear, amber, tacky resin having an acid number of 17 and a converted styrene content of 48%. An air-dried varnish film obtained from this product was somewhat frosted.

*Example 5.*—Sebacic acid-modified chlorostyrene copolymer of soya-maleic-glyceride.

A mixture of 123 grams (0.2 mole) of soya oil acids-diglyceride (prepared as in Example 1) and 5 grams (0.05 mole) of maleic anhydride was heated under agitation for 10 minutes at 165–172° C. The acid-ester thus formed was cooled to 142° C., and to it there was added 128 grams of a monomer mixture consisting of ortho- and para-chlorostyrene and 0.77 grams of di-tertiary butyl peroxide. The resulting solution was heated under a reflux condenser for 10 minutes at 100°–174° C. and then for 2.5 hours at 174–183° C. The condenser was then turned for distillation and a carbon dioxide inlet was provided. Sebacic acid in the amount of 10 grams (0.05 mole) was added and the temperature of the batch was raised to 247° C. At this stage a cold pill of the product was opaque. The temperature was then raised to 300° C. over a period of 1 hour and after the flow of carbon dioxide was stopped, heating was continued for 0.5 hour at 290–300° C. under a pressure of 35 mm. mercury. The resulting product had an acid number of 5.5 and a converted monomer content of 47%. At room temperature it was a slightly tacky, rather tough, amber-colored, slightly turbid resin. A 50% solution of the product in a mixture of 2 parts of mineral spirits and 1 part of xylene (by weight) was clear after filtration. Cobalt naphthenate was added to give 0.03% Co based on solids. A film of this varnish dried in 4 hours. After 5.5 hours the film had a Sward hardness of 29.

*Example 6.*—Phthalic-modified styrene copolymer of linseed-maleic glyceride.

Linseed glyceride was made by heating 1760 grams (2 moles) of refined linseed oil, 92 grams (1 mole) of glycerol and 0.5 gram litharge at 240° C. for 2 hours. In a reactor equipped with stirrer, thermometer and reflux condenser, 150 grams of the diglyceride (0.25 mole) and 6 grams (0.06 mole) of maleic anhydride were heated for 10 minutes at 170° C. Then 150 grams of styrene and 3 grams of benzoyl peroxide were added and polymerization was carried out by heating the mixture for 3 hours at 150°–160° C., after which the condenser was turned for distillation and the temperature gradually raised to 240° C. During this period 33 grams of unreacted styrene distilled. Nine grams (0.06 mole) of phthalic anhydride was added and the mixture was heated for 1.5 hours at 240–250° C. in an atmosphere of carbon dioxide. The product was a light-colored, soft, somewhat turbid resin of acid number 12.5.

A varnish was made by dissolving the product in a mixture of 2 parts mineral spirits and 1 part xylene to form a 50% solution and adding naphthenate drier to give 0.16% Pb and 0.02% Co (based on solids). The varnish was clear after filtration and a film dried dust-free in 0.75 hour and tack-free in 2 hours.

Turbidity of such a resin may be overcome by adding a small amount of glycerol along with the phthalic anhydride. However, this procedure causes somewhat slower drying of the varnish.

*Example 7.*—Sebacic-modified styrene copolymer of linseed-maleic-glyceride.

A mixture of 150 grams (0.25 mole) of linseed diglyceride prepared as in Example 6 and 6 grams of maleic anhydride (0.06 mole) was heated at 170° C. for 5 minutes, after which 150 grams of styrene and 1 gram of tertiary butyl peroxide were added. Polymerization was accomplished by raising the temperature of the mixture to 140° C., then slowly to 150° C. and keeping the temperature at 150°–165° C. for 3.5 hours. Sebacic acid in the amount of 12.3 grams (0.06 mole) was added and unreacted styrene (16.5 grams) was distilled off. Esterification for 2 hours at 225° C. gave turbid product of said acid number 19.4. Further, esterification for 2 hours at 240–250° C. produced a clear, light-colored, soft resin having a polymerized styrene content of 45% and acid number of 9.6.

A varnish prepared as in Example 6 dried dust-free in 0.5 hour and tack-free in 2 hours.

*Example 8.*—Linseed maleic adduct-modified styrene copolymer of linseed-maleic-glyceride.

A mixture of 150 grams (0.25 mole) of linseed oil acids-diglyceride (prepared as in Example 6) and 9.2 grams (0.09 mol.) of maleic anhydride was reacted for 20 minutes at 150–165° C. The acid-ester thus obtained was mixed with 109 grams of styrene and 0.8 gram of di-tertiary butyl peroxide, and heated under reflux for 2.5 hours at 155–183° C. to effect polymerization. The condenser was then turned for distillation. To the polymerizate there was added 42 grams of an adduct (of acid number 83) obtained by heating linseed oil with 10% of maleic anhydride, the amount of adduct being equivalent to 0.03 mole maleic anhydride. The mixture of maleated oil and polymerizate was heated to 233° C. and held at that temperature for 1.75 hours under carbon dioxide. The product at 25° C. was a semi-solid, tacky resin having an acid number of 17.5 and a converted styrene content of 33%. It was compatible with raw linseed oil, tung oil, ester gum and cumarone-indene resin.

A varnish was prepared by dissolving the product in an equal weight of mineral spirits and adding sufficient cobalt naphthenate to give 0.03% Co based on non-volatiles. A film of this varnish exposed at room temperature was dust-free in 1 hour and tack-free in 3 hours. A film aged 3 days had a Sward hardness of 20 and when immersed in tap water for 3 days it became only faintly turbid.

*Example 9.*—Boric acid-modified styrene copolymer of linseed-maleic-glyceride.

A reactor equipped with stirrer and thermometer was charged with 150 grams (0.25 mole) of linseed oil acids-diglyceride (prepared as in Example 6) and 9.2 grams (0.09 mole) of maleic anhydride and heated for 20 minutes at 150–165° C. The product was dissolved in 109 grams of styrene (to which had been added 0.8 gram of di-tertiary butyl peroxide) and the resulting solution was heated for 2.5 hours under reflux at 155–183° C. to effect polymerization. After changing the condenser for distillation and providing a tube for introducing carbon dioxide into the batch, boric acid in the amount of 1.2 grams (0.02 mole) was added to the polymerizate. Removal of unreacted monomer and esterification were effected by heating the mixed ingredients to 235° C. in 10 minutes and holding at that temperature for 1 hour. The resulting product, cooled to 25° C., was a pale, amber-colored, semi-solid resin having an acid number of 17 and a converted styrene content of 37%.

A varnish prepared from this product had good drying characteristics.

*Example 10.*—Rosin-phthalic-modified styrene copolymer of linseed-maleic-glyceride.

A reactor equipped with thermometer and stirrer was charged with 246 grams (0.4 mole) of linseed diglyceride (prepared as in Example 6) and 9.8 grams (0.1 mole) of maleic anhydride. The mixture was heated for 10 minutes at 160–170° C., and cooled to 150° C. To the acid-ester mixture thus formed there was added a solution consisting of 190 grams of styrene and 1.4 grams of di-tertiary butyl peroxide. To effect polymerization, the mixture of ingredients was heated under reflux for 0.5 hour at 110–167° C. and then for 1.5 hours at 167–170° C. At this point 11.2 grams (0.075 mole) of phthalic anhydride and 16.6 grams (0.050 mole) of rosin were added. Provision was made for bubbling carbon dioxide through the mixture and the reflux attachment was replaced by a distillation tube containing a 20 cm. vertical section. The reactants were heated according to the following schedule:

0.3 hr. at 170–212° C.
3.0 hr. at 212–222° C.
0.5 hr. at 222–260° C.
1.3 hr. at 260° C.

Throughout this treatment the little remaining styrene monomer slowly disappeared from the reaction chamber, partly by distillation and partly by polymerization. In this manner the water of esterification was largely removed by azeotropic distillation. The product thus obtained, when cooled to room temperature, was an amber-colored, tacky, semi-solid resin having an acid number of 10.7 and a converted styrene content of 39%.

A varnish was prepared by dissolving a portion of the resin in an equal weight of mixed solvents (2 parts of mineral spirits plus 1 part of xylene by weight) and adding cobalt naphthenate to give 0.03% Co based on non-volatiles. The varnish had a Gardner viscosity of A—B. When a thin film of the varnish was cast on a glass panel and exposed at room temperature, it became dust-free in 0.75 hour and tack-free in 3 hours. Sward rocker hardness made after 4.5 hours and 24 hours' exposure of the film were 22 and 34, respectively. The 24 hour aged film was clear, tough and unusually adherent.

*Example 11.*—Maleic acid-modified butyl methacrylate copolymer of soya-maleic-glyceride.

A mixture of 123 grams (0.2 mole) of soya oil acids-diglyceride (prepared as in Example 1) and 4.9 grams (0.05 mole) of maleic anhydride was heated for 10 minutes at 160–170° C. The product of this reaction was dissolved in 128 grams of butyl methacrylate to which had been added 0.77 gram of di-tertiary butyl peroxide. The solution was heated under reflux as follows:

¾ hr. at 100–174° C.
6 hrs. at 174–193° C.

Unconverted monomer was removed under vacuum generated by a water-aspirator. Maleic anhydride in the amount of 4.9 grams (0.05 mole) was then added to the polymerizate, and the mixture was heated under carbon dioxide at atmospheric pressure for 1.3 hours at 235 to 275° C. The flow of carbon dioxide was discontinued, vacuum was re-applied, and reaction was continued for 50 minutes at 275° C. The product obtained was a clear, amber, viscous oil having an acid number of 7.2 and a converted monomer content of 42%. It was compatible with raw or bodied linseed oil.

It will be understood that it is intended to cover all changes and modifications of the examples of the invention herein chosen for the purpose of illustration which do not constitute departures from the spirit and scope of the invention.

I claim:
1. The process of making coating material, which comprises the steps of: (1) heating 2 moles of a monohydroxyl-containing ester of formula $D_{n-1}POH$, wherein D is the acid radical of an unpolymerized drying oil acid free from conjugated unsaturation, P is the hydroxyl-free radical of an esterifiable polyhydric alcohol $P(OH)_n$, and $n$ is the number of hydroxyl groups in said polyhydric alcohol, with from 0.3 to 0.9 mole of maleic anhydride at from 140° C. to 200° C. to form a maleic acid half-ester in the presence of an excess of said hydroxy-ester, (2) adding a liquid monomeric unsaturated polymerizable compound in which the unsaturation is due to a single terminal ethylenic group $>C=CH_2$ and which is copolymerizable with said maleic half-ester and heating the mixture at between 120° C. and below 200° C. to copolymerize same, the proportion of liquid monomeric compound in the mixture being from 5% to 90%, and (3) adding a carboxylic acid reactable only by esterification in amount equivalent to the difference between 1 mole of maleic anhydride and the amount thereof used in step 1, and heating the composition at from 200° to 300° C. to esterify same.

2. The process of making coating material, which comprises the steps of: (1) heating 2 moles of a monohydroxyl-containing ester of formula $D_{n-1}POH$, wherein D is the acid radical of an unpolymerized drying oil acid free from conjugated unsaturation, P is the hydroxyl-free radical of an esterifiable polyhydric alcohol $P(OH)_n$, and $n$ is the number of hydroxyl groups in said polyhydric alcohol, with from 0.3 to 0.9 mole of maleic anhydride at from 140° C. to 200° C. to form a maleic acid half-ester in the presence of an excess of said hydroxy-ester, (2) adding styrene and heating the mixture at between 120° C. and below 200° C. to copolymerize same, the proportion of styrene in the mixture being from 5% to 90%, and (3) adding a carboxylic acid reactable only by esterification in amount equivalent to the difference between 1 mole of maleic anhydride and the amount thereof used in step 1, and heating the composition at from 200° to 300° C. to esterify same.

3. The process of claim 2, wherein D represents the radical of linseed oil acids.

4. The process of claim 2, wherein D represents the radical of soya bean oil acids.

5. The process of making coating material, which comprises the steps of: (1) heating 2 moles of the diglyceride of soya bean oil acids at from 140° to 200° C. with from 0.3 to 0.9 mole of maleic anhydride to form a maleic acid half-ester of soya acids-diglyceride in the presence of an excess of said diglyceride, (2) adding styrene and heating the mixture at between 120° C. and below 200° C. to copolymerize same, the proportion of styrene in the mixture being from 5% to 90%, and (3) adding rosin in amount equivalent to the difference between 1 mole of maleic anhydride and the amount thereof used in step 1, and heating the composition at from 200° to 300° C. to esterify same.

6. The process of making coating material, which comprises the steps of: (1) heating 2 moles of the diglyceride of soya bean oil acids at from 140° C. to 200° C. with from 0.3 to 0.9 mole of maleic anhydride to form a maleic acid half-ester of soya acids-diglyceride in the presence of an excess of said diglyceride, (2) adding styrene and heating the mixture at between 120° C. and below 200° C. to copolymerize same, the proportion of styrene in the mixture being from 5% to 90%, and (3) adding phthalic anhydride in amount equivalent to the difference between 1 mole of maleic anhydride and the amount thereof used in step 1, and heating the composition at from 200° to 300° C. to esterify same.

7. The process of making coating material, which comprises the steps of: (1) heating 2 moles of the diglyceride of linseed oil acids at from 140° C. to 200° C. with from 0.3 to 0.9 mole of maleic anhydride to form a maleic acid half-ester of linseed acids-diglyceride in the presence of an excess of said diglyceride, (2) adding styrene and heating the mixture at between 120° C. and below 200° C. to copolymerize same, the proportion of styrene in the mixture being from 5% to 90%, and (3) adding sebacic acid in amount equivalent to the difference between 1 mole of maleic anhydride and the amount thereof used in step 1, and heating the composition at from 200° to 300° C. to esterify same.

8. The process of making a composition suitable for coating purposes, which comprises the steps of: (1) heating 2 moles of the diglyceride of soya bean oil acids at from 140° C. to 200° C. with 0.75 mole of maleic anhydride to form a half-ester of soya acids-diglyceride from all the maleic anhydride, (2) adding styrene and heating the mixture at between 120° C. and below 200° C. to copolymerize same, the proportion of styrene in the mixture being from 5% to 90%, and (3) adding 0.5 mole of rosin and heating the composition at from 200° C. to 300° C. to esterify same.

9. The process of making a composition suitable for coating purposes, which comprises the steps of: (1) heating 2 moles of the diglyceride of soya bean oil acids at from 140° C. to 200° C. with 0.75 mole of maleic anhydride to form a half-ester of soya acids-diglyceride from all the maleic anhydride, (2) adding styrene and heating the mixture at between 120° C. and below 200° C. to copolymerize same, the proportion of styrene in the mixture being from 5% to 90%, and (3) adding 0.25 mole of phthalic anhydride and heating the composition at from 200° C. to 300° C. to esterify same.

10. The process of making a composition suitable for coating purposes, which comprises the steps of: (1) heating 2 moles of the diglyceride of linseed oil acids at from 140° C. to 200° C. with 0.5 mole of maleic anhydride to form a half-ester of linseed acids-diglyceride from all the maleic anhydride, (2) adding styrene and heating the mixture at between 120° C. and below 200° C. to copolymerize same, the proportion of styrene in the mixture being from 5% to 90%, and (3) adding 0.5 mole of sabacic acid and heating the composition at from 200° C. to 300° C. to esterify same.

11. A varnish comprising the product of claim 13 dissolved in a volatile hydrocarbon solvent therefor.

12. A varnish comprising the product of claim 14 dissolved in a volatile hydrocarbon solvent therefor.

13. Coating material comprising an ester consisting of a monohydroxyl-containing polyhydric alcohol-drying oil acids ester having the formula $D_{n-1}POH$, wherein D is the acid radical of drying oil acids free from conjugated unsaturation, P is the hydroxyl-free radical of an esterifiable polyhydric alcohol $P(OH)_n$ and $n$ is the number of hydroxyl groups in said polyhydric alcohol, esterified with: (A) the polymer resulting from the conjoint polymerization of a mixture of (a) a maleic acid half-ester of said monohydroxyl-containing ester and (b) a liquid monomeric unsaturated polymerizable compound in which the unsaturation is due to a single terminal ethylenic linkage $>C=CH_2$ and which is copolymerizable with said maleic acid half-ester, the proportion of monomeric compound in the mixture being from 5% to 90%, and (B) a carboxylic acid reactable only by esterification, the maleic half-ester being equivalent to from 0.3 to 0.9 mole of maleic anhydride and said esterifiable carboxylic acid being equivalent to the difference between 1 mole of maleic anhydride and the amount forming the half-ester, as produced by the process of claim 1.

14. Coating material comprising an ester consisting of a monohydroxyl-containing polyhydric alcohol-drying oil acids ester having the formula $D_{n-1}POH$, wherein D is the acid radical of drying oil acids free from conjugated unsaturation, P is the hydroxyl-free radical of an esterifiable polyhydric alcohol $P(OH)_n$ and $n$ is the number of hydroxyl groups in said polyhydric alcohol, esterified with: (A) the polymer resulting from the conjoint polymerization of a mixture of (a) a maleic acid half-ester of said monohydroxyl-containing ester and (b) styrene in amount equal to 5% to 90% of the mixture, and (B) a carboxylic acid reactable only by esterification, the maleic half-ester being equivalent to from 0.3 to 0.9 mole of maleic anhydride and said esterifiable carboxylic acid being equivalent to the difference between 1 mole of maleic anhydride and the amount forming the half-ester, as produced by the process of claim 2.

15. The product of claim 14 in which D represents the radical of linseed oil acids.

16. The product of claim 14 in which D represents the radical of soya bean oil acids.

17. The product as produced by the method of claim 5.

18. The product as produced by the method of claim 6.

19. The product as produced by the method of claim 7.

20. The product as produced by the method of claim 8.

21. The product as produced by the method of claim 9.

22. The product as produced by the method of claim 10.

FRANK B. ROOT.

REFERENCES CITED

The following references are of record in the file of this patent:

UNITED STATES PATENTS

| Number | Name | Date |
|---|---|---|
| 2,190,789 | Hubbuch | Feb. 20, 1940 |
| 2,308,495 | D'Alelio | Jan. 19, 1943 |
| 2,392,710 | Wakeford et al. | Jan. 8, 1946 |
| 2,457,657 | Glick | Dec. 28, 1948 |